(12) United States Patent
Kusano et al.

(10) Patent No.: US 8,227,744 B2
(45) Date of Patent: Jul. 24, 2012

(54) ABSOLUTE POSITION LENGTH MEASUREMENT TYPE ENCODER

(75) Inventors: Kouhei Kusano, Kawasaki (JP); Kouji Morimoto, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 424 days.

(21) Appl. No.: 12/423,297

(22) Filed: Apr. 14, 2009

(65) Prior Publication Data

US 2009/0256065 A1 Oct. 15, 2009

(30) Foreign Application Priority Data

Apr. 15, 2008 (JP) ................................. 2008-106131

(51) Int. Cl.
*G01D 5/34* (2006.01)
(52) U.S. Cl. ............................. 250/231.13; 250/231.18
(58) Field of Classification Search .. 250/231.1–231.18, 250/568; 33/706, 707, 1 N, 1 PT; 341/13, 341/14; 365/163–165; 356/616–617
See application file for complete search history.

(56) References Cited

U.S. PATENT DOCUMENTS

| | | | | |
|---|---|---|---|---|
| 4,266,125 | A * | 5/1981 | Epstein et al. ............ | 250/231.16 |
| 6,279,248 | B1 * | 8/2001 | Walters ....................... | 33/784 |
| 6,470,148 | B2 * | 10/2002 | Ide et al. .................... | 396/80 |
| 7,565,256 | B2 * | 7/2009 | Kusano ....................... | 702/117 |
| 8,022,354 | B2 * | 9/2011 | Kusano et al. ............ | 250/231.13 |
| 2004/0118758 | A1 * | 6/2004 | Gordon-Ingram ......... | 210/100 |
| 2008/0015805 | A1 | 1/2008 | Kusano | |

FOREIGN PATENT DOCUMENTS

| | | |
|---|---|---|
| JP | 64-082270 | 3/1989 |
| JP | 03-068081 | 3/1991 |
| JP | 2003-337941 | 11/2003 |
| JP | 2006-226987 | 8/2006 |
| JP | 2007-218691 | 8/2007 |

OTHER PUBLICATIONS

English translation of Japanese Office action dated May 29, 2012 in corresponding Japanese application.

* cited by examiner

*Primary Examiner* — Georgia Y Epps
*Assistant Examiner* — Renee Naphas
(74) *Attorney, Agent, or Firm* — Rankin, Hill & Clark LLP (57) ABSTRACT

An absolute position length measurement type encoder includes: a scale which has an ABS pattern based on a pseudorandom code and forms bright and dark patterns by the ABS pattern; a light-receiving element for receiving the bright and dark patterns; a binarization circuit for dividing a digital signal in accordance with a signal output from the light-receiving element into a mode having high brightness and a mode having lower brightness, carrying out a binarization process by a threshold value where dispersion with regard to the two modes is maximized, and decoding the pseudorandom code by the unit of minimum line width of the ABS pattern from the binarized values; and a position detection circuit for calculating the absolute position of the scale with respect to the light-receiving element by acquiring the correlation between the decoded pseudorandom code and the design value of the pseudorandom code. Thereby, binarization errors of signals produced by the ABS pattern can be reduced, and highly accurate and stabilized measurement of an absolute position is carried out.

6 Claims, 5 Drawing Sheets

ABSOLUTE POSITION LENGTH MEASUREMENT TYPE ENCODER

CROSS-REFERENCE TO RELATED APPLICATION

The disclosure of Japanese Patent Application No. 2008-106131 filed on Apr. 15, 2008 including specifications, drawings and claims is incorporated herein by reference in its entirety.

BACKGROUND OF THE INVENTION

1. Field of the Invention

The present invention relates to an absolute position length measurement type encoder that includes a light-emitting element, a scale for forming bright and dark patterns with pseudorandom codes on projection light of the light-emitting element, and a light-receiving element, and in particular to an absolute position length measurement type encoder capable of carrying out highly accurate measurement in a stabilized state even if the scale is contaminated and/or the light-receiving amount is not even.

2. Description of the Related Art

Accurate position control and measurement are indispensable in measuring instruments and apparatuses. Therefore, an absolute position length measurement type encoder capable of executing absolute position measurement over some length has been used. In particular, where high accuracy is required, a photoelectric type encoder has been used.

Generally, an absolute position length measurement type photoelectric encoder has an absolute pattern (hereinafter called an ABS pattern) to roughly measure a moving distance and an incremental pattern (hereinafter called an INC pattern) to measure a moving distance at high resolution power by interpolating the interval of a roughly obtained moving distance on a scale (For example, Japanese Published Unexamined Patent Application No. 2003-254786 (hereinafter called Patent Document 1), Japanese Translation of International Application (Kohyo) No. 2005-515418 (hereinafter called Patent Document 2)). And, for example, the scale is attached to a moving stage side, and the light-emitting element and light-receiving element are attached to the base side that supports the stage.

And, since bright and dark patterns formed by ABS pattern and INC pattern, which are formed on the scale, change on the light-receiving element, which receives the bright and dark patterns, in line with movement of the stage, the moving distance can be measured at high accuracy by processing the change in a signal processing circuit. In detail, rough absolute positions are obtained by the ABS pattern, and a minute position between the absolute positions obtained by the ABS pattern is obtained by the INC pattern. That is, it is necessary that the absolute position itself obtained by the ABS pattern be stabilized with high accuracy. Also, a plurality of patterns whose cycles differ from each other are used as the ABS pattern, and the absolute positions are obtained by the phase relationship thereof. However, as the measurement distance is lengthened, such a problem arises in which the number of the above-described patterns is increased, and the scale and light-receiving element are large-sized. Accordingly, the absolute position length measuring type encoder itself can be downsized by using a single pattern based on a pseudorandom code as the ABS pattern.

However, where the pseudorandom pattern is used as the ABS pattern, in order to measure the absolute position, it is indispensable that the pseudorandom code is decoded from the signals produced from the ABS pattern. Therefore, it is necessary to carry out a binarization process. Patent Document 1 and Patent Document 2 disclose a method for the binarization process. For example, in Patent Document 1, signals produced by the ABS pattern are binarized by controlling the threshold values for the binarization process using bright and dark signals of the INC pattern. Further, in Patent Document 2, signals produced from the ABS pattern are binarized by comparing the outputs with each other in the light-receiving elements.

However, in these methods, the threshold values become unstable due to contamination of the ABS pattern and breakage of the ABS pattern as a practical problem, wherein a binarization error is likely to occur by which erroneous binarization is carried out, and resultantly there is a fear that measurement of an absolute position is not carried out in a stabilized state at high accuracy.

SUMMARY OF THE INVENTION

The present invention was developed in order to solve the prior art problems, and it is therefore an object of the invention to provide an absolute position length measurement type encoder capable of reducing a binarization error of signals produced from the ABS pattern and capable of carrying out highly accurate measurement of an absolute position in a stabilized state.

A first aspect of the invention of the present application solves the above-described problems by including:

a light-emitting element;

a scale which has an absolute pattern (hereinafter called an ABS pattern) based on a pseudorandom code and forms bright and dark patterns by the absolute pattern with respect to projection light from the light-emitting element;

a light-receiving element for receiving the bright and dark patterns;

a binarization circuit for dividing digital signals in accordance with signals output from the light-receiving elements into a mode having high brightness and a mode having lower brightness, carrying out a binarization process by a threshold value where dispersion with regard to the two modes (hereinafter called between-mode dispersion) is maximized, and decoding the pseudorandom code at the unit of minimum line width of the absolute pattern from the binarized values; and a position detection circuit for calculating the absolute position of the scale with respect to the light-receiving element by acquiring the correlation between the decoded pseudorandom code and the design value of the pseudorandom code.

A second aspect of the invention of the present application is characterized in that the scale includes an absolute pattern and an incremental pattern.

A third aspect of the invention of the present application is characterized in that the bright and dark patterns formed by the scale are imaged on the light-receiving element via a lens array in which a plurality of lens are juxtaposed to and linked with each other.

A fourth aspect of the invention of the present application is characterized in that the lens array is applied to the incremental pattern.

Further, a fifth aspect of the invention of the present application is characterized in that the lens array is devised so as to simultaneously cover the absolute pattern and the incremental pattern.

In addition, a sixth aspect of the invention of the present application is characterized in that the lens array is devised so as to cover the absolute pattern and the incremental pattern individually.

Further, a seventh aspect of the invention of the present application is characterized in that the binarization circuit obtains the total numbers of the binarized values (1 and 0), respectively, at a cycle of the minimum line width of the ABS pattern, and decodes the code by determining the code of the minimum line width by a value (0 or 1) the total number of which is greater.

Also, an eight aspect of the invention of the present application is characterized in that the binarization circuit stores the previous dispersion, compares it with the dispersion of this time, determines abnormality if remarkably different, and outputs a trouble signal.

Further, a ninth aspect of the invention of the present application is characterized in that the dispersion is made into at least any one of the between-mode dispersion, in-mode dispersion and dispersion of the entirety of data.

In addition, a tenth aspect of the invention of the present application is characterized in that the decoding is carried out by the unit of the minimum line width of the absolute pattern.

According to the present invention, since it is possible to principally obtain the optimal threshold value to divide into two modes, a binarization error of signals, which is likely to occur from the ABS pattern, is reduced, and highly accurate measurement of the absolute position can be carried out in a stabilized state.

In particular, where bright and dark patterns are imaged on the light-receiving element using a lens array, it is possible to obtain the optimal threshold value for each of the minor lenses that compose the lens array. That is, it is possible to reduce influences due to a change in light amount based on unevenness in production of the minor lenses and in unevenness in sensitivity of light-receiving elements for each of the respective minor lenses. Accordingly, since the lens array in which respective minor lenses are uneven in the characteristics thereof can be used, it is possible to achieve an absolute position length measurement type encoder, which has strength against disturbance while being thin, and the production cost of which is low, in addition to the above-described effects.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

A detailed description is given below of embodiments of the present invention with reference to the drawings.

Figures 1, 2:
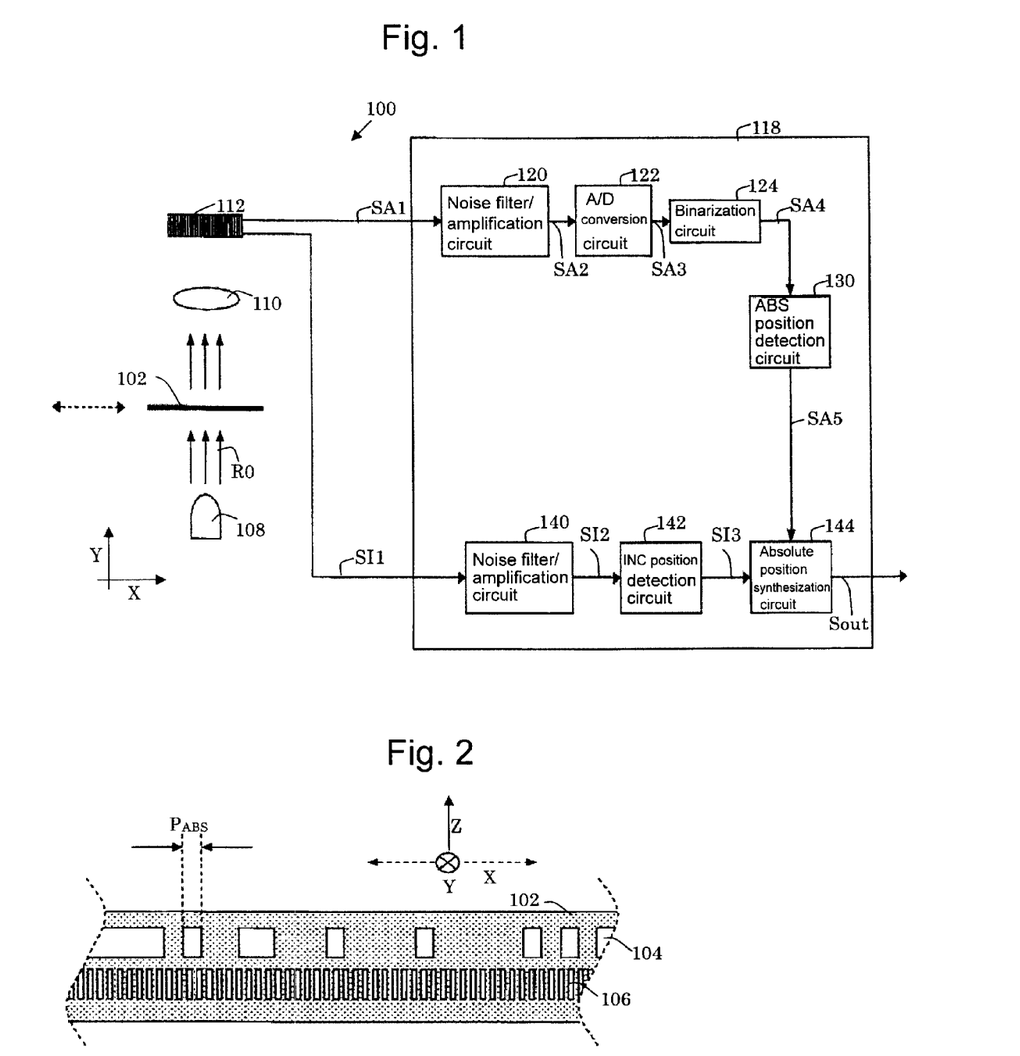
FIG. 1 is a schematic view showing the entirety of an absolute position length measurement type encoder according to Embodiment 1 of the present invention.
FIG. 2 is a schematic view showing the scale thereof.
Figure 3:
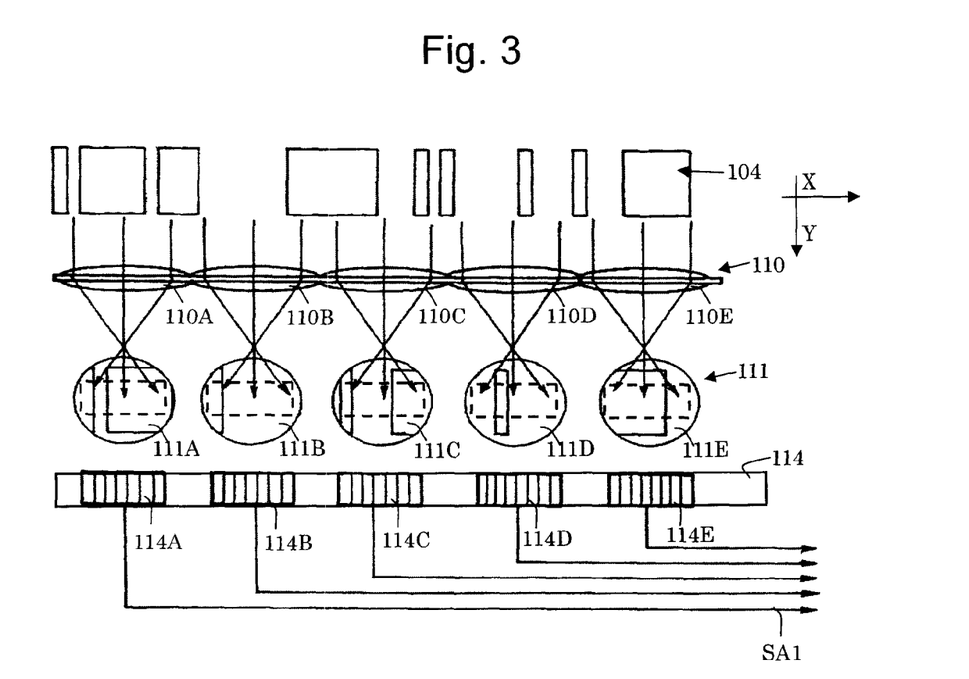
FIG. 3 is a schematic view showing the relationship between the ABS pattern, the lens array and the light-receiving element thereof.
Figure 4:
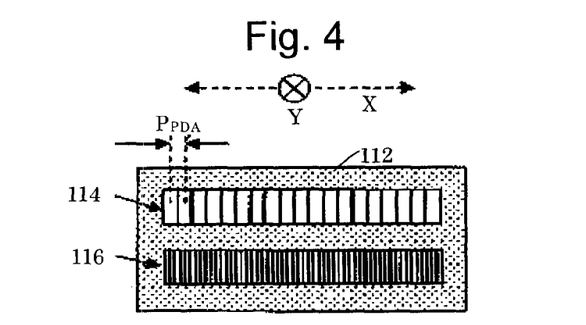
FIG. 4 is a schematic view showing the light-receiving element thereof.
Figure 5:
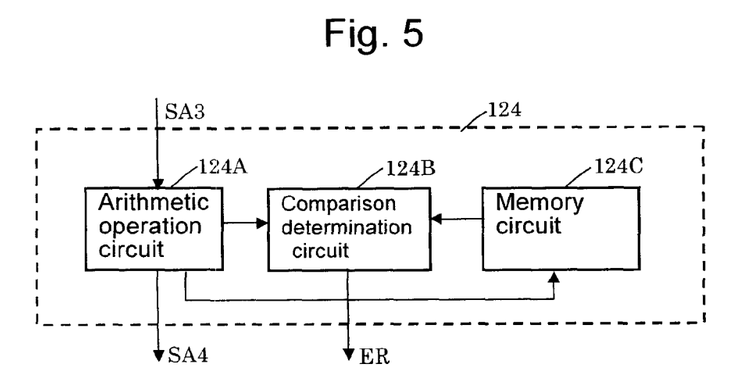
FIG. 5 is a view schematically showing the configuration of a binarization circuit thereof.
Figure 6:
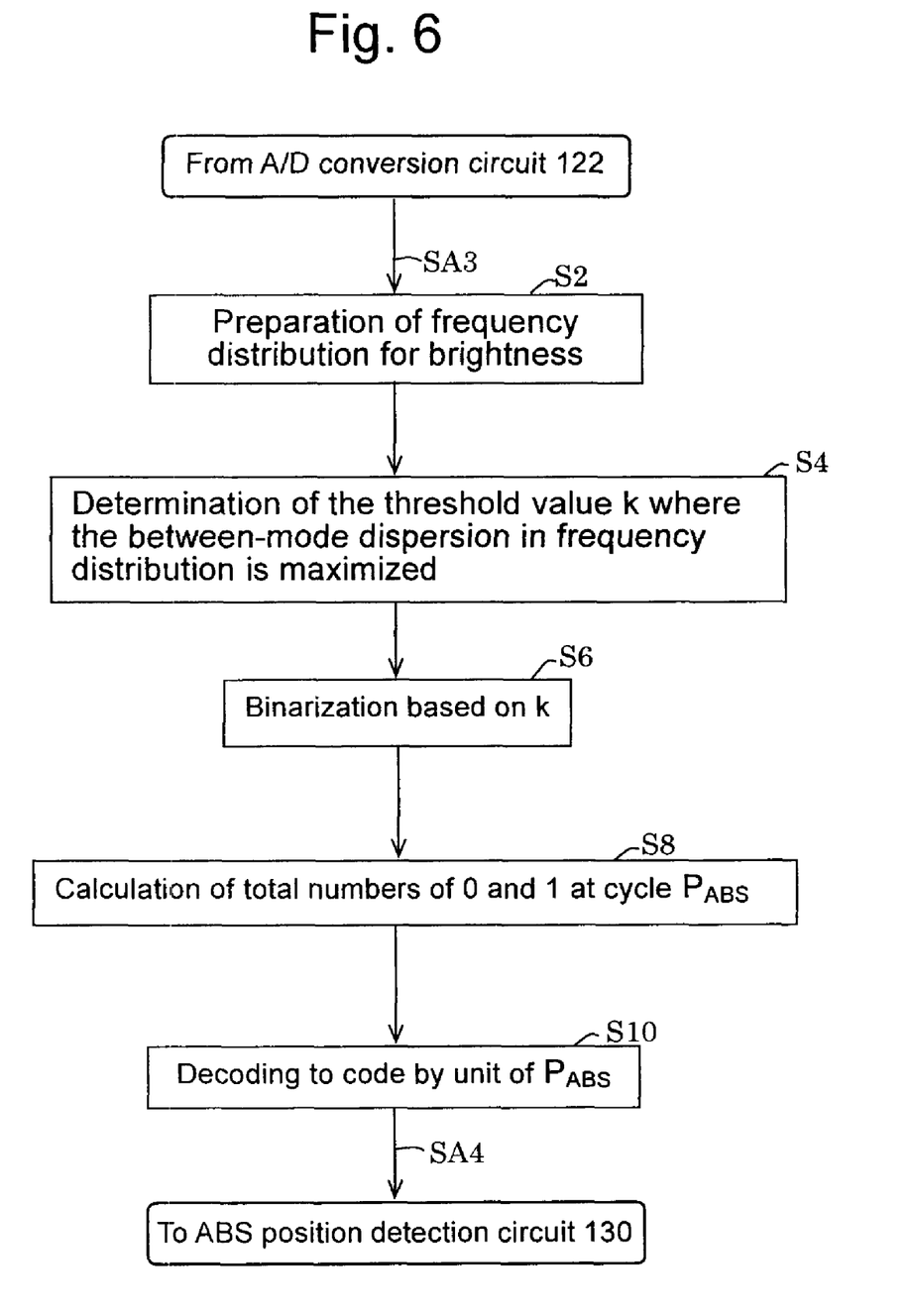
FIG. 6 is a flowchart showing operations of the binarization circuit thereof.
Figure 7:
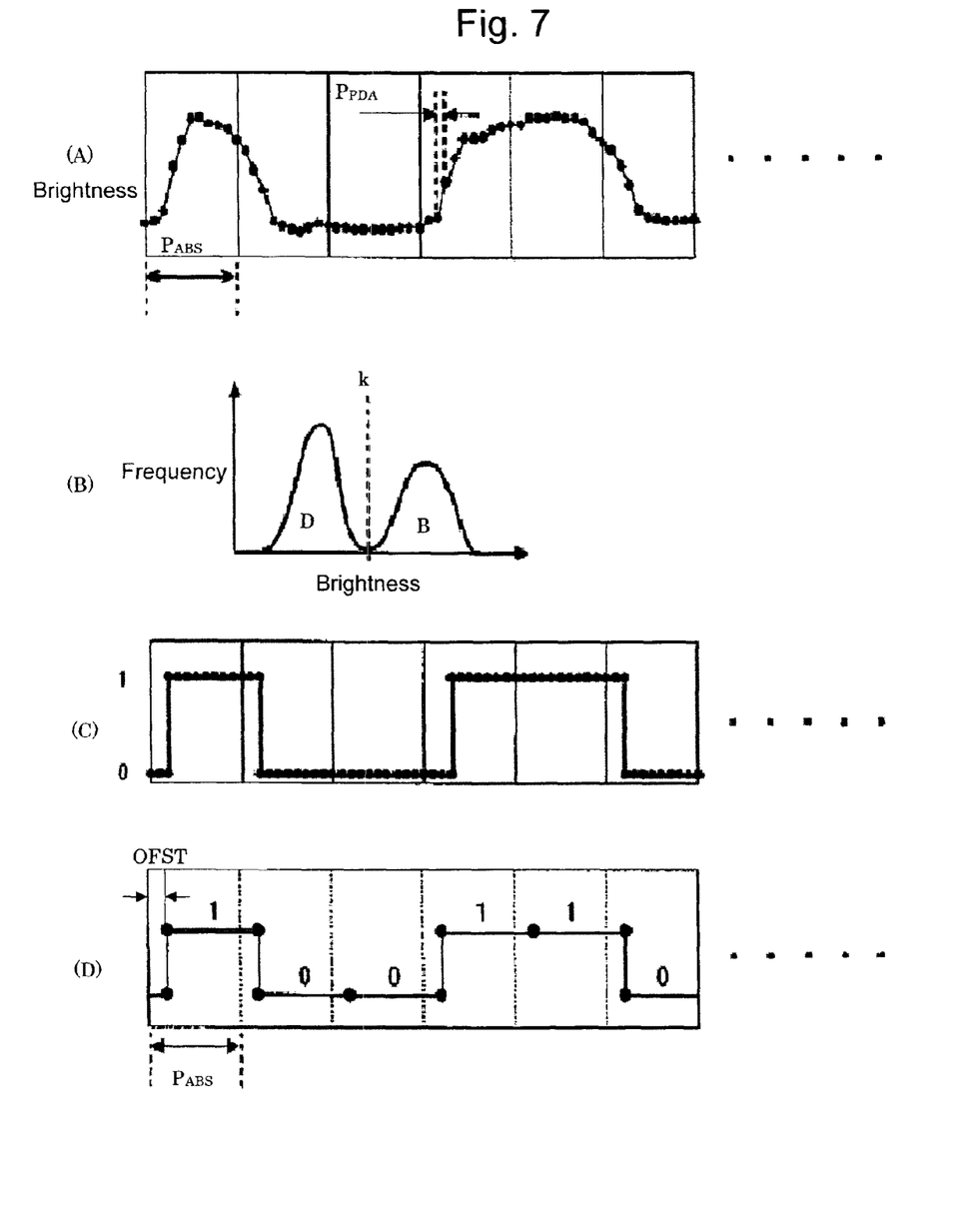
FIG. 7 is a schematic view showing signals corresponding to respective steps of FIG. 6.

A description is given of Embodiment 1 according to the present invention using FIG. 1 through FIG. 7. FIG. 1 is a schematic view showing the entirety of an absolute position length measurement type encoder according to Embodiment 1 of the invention. FIG. 2 is a schematic view showing the scale. FIG. 3 is a schematic view showing the relationship between the ABS pattern, the lens array and the light-receiving element. FIG. 4 is a schematic view showing the light-receiving element. FIG. 5 is a view schematically showing the configuration of a binarization circuit. FIG. 6 is a flowchart showing operations of the binarization circuit. FIG. 7 is a schematic view showing signals corresponding to respective steps of FIG. 6.

First, a brief description is given of the present embodiment.

Particularly as shown in FIG. 1, an absolute position length measurement type encoder 100 includes:

a light-emitting element 108, a scale 102 (refer to FIG. 2) having ABS pattern 104 based on a pseudorandom code and forming bright and dark patterns on projection light R0 from the light-emitting element 108 by means of the ABS pattern 104;

a light-receiving element 112 for receiving bright and dark patterns;

a binarization circuit 124, which divides digital signals SA3 in accordance with signals (ABS bright and dark signals) SA1 output from the light-receiving element 112 into two, that is, a mode B having high brightness and a mode D having low brightness, carries out a binarization process by a threshold value k at which dispersion between the two modes (hereinafter called "between-mode dispersion") $\sigma_B^2$ is maximized, and decodes the pseudorandom codes by the unit of the minimum line width $P_{ABS}$ of the ABS pattern 104 from the binarized values; and an ABS position detection circuit (position detection circuit) 130 for calculating the absolute position of the scale 102 for the light-receiving element 112 by acquiring the correlation between the decoded pseudorandom codes and the design value of the pseudorandom codes.

A detailed description is given below of respective components.

As shown in FIG. 2, the scale 102 includes the ABS pattern 104 and the INC pattern 106. As shown in FIG. 1 and FIG. 2, as light R0 projected from the light-emitting element 108 is irradiated onto the scale 102 orthogonal to the optical axis direction (Y-axis direction), bright and dark patterns are imaged on the light-receiving element 112 via the lens 110 by means of the ABS pattern 104 and the INC pattern 106. Both the patterns 104 and 106 are formed along the X-axis direction. The ABS pattern 104 and the INC pattern 106 can form bright and dark patterns by being brought into a transparent state where the projection light R0 is not interrupted, if the code is 1, and into a non-transparent state where the projection light R0 is interrupted, if the code is 0, for example.

A pseudorandom code is used for the ABS pattern 104. Here, for example, M series, which becomes the longest cycle, of the code series generated by a shift register may be used as the pseudorandom code. At this time, the line width per one pseudorandom code becomes the minimum line width $P_{ABS}$ of the ABS pattern 104 as shown in FIG. 2. The INC pattern 106 is a pattern consisting of cyclically formed 1 and 0. In the present embodiment, the ABS pattern 104 is disposed upside in the Z-axis direction in FIG. 2 while the INC pattern 106 is disposed downside. For example, an LED may be used as the light-emitting element 108.

As shown in FIG. 3, the lens 110 is, for example, a lens array in which a plurality of minor lenses 111A through 110E are linked to each other in parallel. The minor lenses 110A through 110E respectively image images 111A through 111E of bright and dark patterns on a light-receiving element array 114 for the ABS pattern (hereinafter referred as ABS light-receiving element array). Here, only the broken-line portion of the ABS light-receiving element array 114, which corresponds to the minor arrays 114A through 114E receives bright and dark patterns. Since the minor lenses 110A through 110E are composed of, for example, a single lens, respectively, the left and right sides of the images 111A through 111E are reversed (In FIG. 3, the left and right sides of the images 111A through 111E of bright and dark patterns by the inside ABS pattern 104 surrounded by circles are opposite to those of the actual ABS pattern 104). Therefore, minor arrays 114A through 114E that compose the ABS light-receiving element array 114 execute output with the sweep direction reversed from the moving direction of the scale 102 in the output.

In the present embodiment, a lens array is applied to the INC pattern 106, using a lens array for the lens 110. Thereby, bright and dark patterns formed by the ABS pattern 104 in a state where the scale 102 and the light-receiving element 112 are proximate to each other can be clearly imaged on the ABS light-receiving element array 114. For this reason, in the present embodiment, the absolute position length measurement type encoder 100 can be made thin, and enables stabilized measurement of a moving distance, which has strength against disturbance. At this time, the minor lenses 110A through 110E may be composed of a single lens (for example, a cylindrical lens) that is capable of covering the ABS pattern 104 and the INC pattern 106 at the same time. Or, two lens arrays may be juxtaposed up and down so as to individually cover the ABS pattern 104 and the INC pattern 106 as the lens 110.

As shown in FIG. 4, the light-receiving element 112 includes two light-receiving element arrays 114 and 116, one of which is the ABS light-receiving element array 114, and the other of which is a light-receiving element array 116 for the INC pattern (hereinafter referred to as an INC light-receiving element array). The ABS light-receiving element array 114 is composed of minor arrays 114A through 114E as described above. The array arrangement pitch $P_{PDA}$ of the ABS light-receiving element array 114 is as shown in FIG. 4. That is, the spatial resolution power of the ABS light-receiving element array 114 becomes an array arrangement pitch $P_{PDA}$. Here, the array arrangement pitch $P_{PDA}$ is narrower than the minimum line width $P_{ABS}$ of the ABS pattern 104, and may be made into, for example, one-third thereof or less. If the array arrangement pitch $P_{PDA}$ is made still narrower, the number of samplings in the minimum line width $P_{ABS}$ is increased, and further highly accurate measurement of the absolute position can be carried out. Also, since no bright and dark patterns are reached between mutual minor arrays 114A through 114E, no pixel need be formed. In the present embodiment, although the minor arrays 114A through 114E are made into series, and compose the ABS light-receiving element array 114, the minor arrays may be separated from each other since the sweep direction is reversed. The ABS Light-receiving element array 114 outputs an ABS bright and dark signal SA1 by sweeping the bright and dark patterns formed by the ABS pattern 104 in the reverse direction of the moving direction of the array direction (the X-axis direction).

The INC light-receiving element array 116 has a four-phase output with a phase difference of 90° (not illustrated). The INC light-receiving element array 116 sweeps the bright and dark patterns formed by the INC pattern 106 in the array direction (the X-axis direction), and outputs the INC bright and dark signal SI1. Also, as in the case of the ABS pattern 104, it is preferable that the sweep direction of the INC pattern 106 is reversed from the moving direction. Where the bright and dark patterns formed by the INC pattern 106 are detected by the INC light-receiving element array 116 consisting of four phases with a phase difference of 90°, a four-phase sinusoidal wave signal with a phase difference of 90° is output. In addition, the array arrangement pitch of the INC light-receiving element array 116 is narrower than the array arrangement pitch $P_{PDA}$ of the ABS light-receiving element array 114 in order to interpolate between an obtained absolute position and the absolute position.

As shown in FIG. 1, a noise filter/amplification circuit 120 processes the ABS bright and dark signal SA1 output from the light-receiving element 112. At this time, the noise filter/amplification circuit 120 cuts off high frequency noise by its low-pass filter, carries out amplification at a predetermined gain, and outputs a signal SA2.

As shown in FIG. 1, an A/D conversion circuit 122 converts the signal SA2 output from the noise filter/amplification circuit 120 from analog signals to digital signals, and outputs a signal SA3.

As shown in FIG. 5, the binarization circuit 124 includes an arithmetic operation circuit 124A, a comparison determination circuit 124B and a memory circuit 124C. The arithmetic operation circuit 124A thereof binarizes the signal SA3 output from the A/D conversion circuit 122 using a predetermined threshold value k. The threshold value k here is a value by which the between-mode dispersion $\sigma_B^2$ is maximized when the signal SA3 is divided into two, that is, mode B having high brightness and mode D having low brightness. The binarization circuit 124 may calculate the between-mode dispersion $\sigma_B^2$ and in-mode dispersion $\sigma_W^2$. The binarized signal is decoded to a pseudorandom code of 0 or 1 by the unit of the minimum line width $P_{ABS}$ of the ABS pattern 104, and the result is output as the ABS decoded signal SA4.

As shown in FIG. 5, the comparison determination circuit 124B reads the dispersion $\sigma_B^2$ from the last time, which is read from the memory circuit 124C, and the dispersion $\sigma_B^2$ newly acquired by the arithmetic operation circuit 124A and compares each other, wherein if the newly acquired dispersion $\sigma_B^2$ remarkably differs, the comparison determination circuit 124B determines an abnormality, and outputs an error signal ER to the periphery of the signal processing circuit 118. The memory circuit 124C may store the dispersion $\sigma_B^2$ and so on obtained by the arithmetic operation circuit 124A. A further detailed description is given below of the operation of the binarization circuit 124.

The ABS position detection circuit (position detection circuit) 130 processes the ABS decoded signal SA4 output from the binarization circuit 124 as shown in FIG. 1. In detail, the ABS position detection circuit 130 arithmetically operates the correlation between the input ABS decoded signal SA4 and the design value of the pseudorandom code used to form the ABS pattern 104. And, the absolute position of the scale 102 with respect to the light-receiving element 112 is calculated, and the ABS position signal SA5 is output.

The noise filter/amplification circuit 140 processes a four-phase sinusoidal wave signal with a phase difference of 90°, which is an INC bright and dark signal SI1, as shown in FIG. 1. In detail, the noise filter/amplification circuit 140 cuts off high frequency noise by its low pass filter with respect to the INC bright and dark signal SI1, carries out amplification at a predetermined gain, and outputs a signal SI2.

The INC position detection circuit 142 processes the signal SI2 output from the noise filter/amplification circuit 140 as shown in FIG. 1. In detail, the INC position detection circuit 142 generates a two-phase sinusoidal wave signal with a phase difference of 90° from the four-phase sinusoidal wave signal with a phase difference of 90°, carries out an arc tangent operation, obtains the relative position and outputs the result as a signal SI3.

As shown in FIG. 1, the absolute position synthesization circuit 144 synthesizes the signal SI3 output from the INC position detection circuit 142 and the ABS position signal SA5 output from the ABS position detection circuit (position detection circuit) 130 and calculates the absolute position at high accuracy and high resolution power. In detail, by finely interpolating the interval between the absolute positions at minute relative positions obtained by the signal SI3 on the basis of absolute positions having rough resolution power, which are obtained at high accuracy by the ABS position signal SA5, the absolute position is calculated at high accuracy and at high resolution power. And, the absolute position thus obtained is output as a position data signal Sout.

Next, referring to FIG. 7, a description is given of a signal processing flow of the binarization circuit 124 based on FIG. 6. Also, FIG. 6 and FIG. 7 show only the arithmetic operation circuit 124A of the binarization circuit 124.

First, when the signal SA3 (refer to FIG. 7(A)) digitalized by the A/D conversion circuit 122 is input into the binarization circuit 124, a histogram the abscissa of which expresses a frequency distribution with respect to the height of the bright and dark level (called brightness) of the signal SA3 is prepared by the arithmetical operation circuit 124A (Step S2). Here, as shown in FIG. 7(A), the signal SA3 is digital data sampled at an interval of the array arrangement pitch $P_{PDA}$ of the ABS light-receiving element array 114.

Next, in the arithmetic operation circuit 124A, the threshold value k by which the frequency distribution is optimally separated from each other by two modes, that is, mode B having high brightness and mode D having low brightness, are optimally separated from each other, is determined using a statistical method (discriminant analysis method). The relationship between the threshold value k, the mode B of high brightness and the mode D of low brightness is brought into an example shown in FIG. 7(B). In detail, using the following expression (1), the threshold value k by which the between-mode dispersion $\sigma_B^2$ composed of the mode B and the mode D is maximized is obtained (Step S4).

$$\sigma_B^2(k) = (\mu_T * \omega(k) - \mu(k))^2 / \omega(k)/(1-\omega(k)) \quad (1)$$

Here, $\mu_T$ is the mean brightness of the entirety of data binarized by the threshold value k. That is, in the present embodiment, $\mu_T$ is obtained by the unit of respective minor arrays 114A through 114E that receive images 111A through 111E of bright and dark patterns imaged by the respective minor lenses 110A through 110E. $\mu(k)$ and $\omega(k)$ are accumulative amounts defined by the following expressions (2) and (3).

[Expression 1]

$$\omega(k) = \sum_{i=1}^{k} Pi \quad (2)$$

$$\mu(k) = \sum_{i=1}^{k} i * Pi \quad (3)$$

Pi is a normalization histogram at brightness i, which satisfies the following expressions (4) and (5).

[Expression 2]

$$P_i = n_i / N \quad (4)$$

$$\sum_{i=1}^{L} Pi = 1 \quad (5)$$

Here, N is the number of the entire data binarized by the threshold value k. That is, in the present embodiment, N is the number of data by the unit of respective minor arrays 114A through 114E that receive images 111A through 111E of bright and dark patterns imaged by the respective minor lenses 110A through 110E. $n_i$ is a frequency at brightness i.

Also, the following expression is established between the between-mode dispersion $\sigma_B^2$ and the in-mode dispersion $\sigma_W^2$.

$$\sigma_b^2 + \sigma_W^2 = \sigma_T^2 \quad (6)$$

$\sigma_T^2$ is the dispersion of the entirety of data binarized by the threshold value k. That is, in the present embodiment, the dispersion $\sigma_B^2$ becomes dispersion by the unit of respective minor arrays 114A through 114E that receive images 111A through 111E of bright and dark patterns imaged by the respective minor lenses 110A through 114E Therefore, abnormality determination is executed by monitoring at least any one of the between-mode dispersion $\sigma_B^2$ and the in-mode dispersion $\sigma_W^2$ (or dispersion $\sigma_T^2$ of the entirety of data) after the dispersion $\sigma_T^2$ of the entirety of data is obtained in advance. In detail, the comparison determination circuit 124B reads dispersion $\sigma_B^2$, $\sigma_W^2$ or $\sigma_T^2$ that is read from the arithmetic operation circuit 124 in the last time from the memory circuit 124C of the binarization circuit 124, and compares the same with dispersion $\sigma_B^2$, $\sigma_W^2$ or $\sigma_T^2$ that is newly obtained by the arithmetic operation circuit 124A. At this time, where the comparison determination circuit 124A determines that dispersion $\sigma_B^2$, $\sigma_W^2$ or $\sigma_T^2$, which cannot be assumed, has been obtained even if age conditions that the memory circuit 124C stores are taken into account, an error signal ER is output to the periphery of the signal processing circuit 118 (Refer to FIG. 5).

Next, binarization is carried out by the arithmetic operation circuit 124A by using the threshold value k obtained based on the expression (1) (Step S6). The signal at this time is made into the example shown in FIG. 7(C).

Next, 1 and 0 are added up respectively at the cycle of the minimum line width $P_{ABS}$ of the ABS pattern 104 in the arithmetic operation circuit 124A, and the totals thereof are obtained (Step S8).

Next, based on the result of adding up by the unit of the minimum line width $P_{ABS}$ of the ABS pattern 104 in the arithmetic operation circuit 124A, comparison is carried out with respect to whether the total number of 1 is greater or the total number of 0 is greater, and the code is determined based on the value of a further greater number. In this state (an example is as in FIG. 7(D)), a differential from the after-binarized data (FIG. 6(C)) is taken. And, the value in which the differential is minimized is determined as the offset value OFST of the pseudorandom code shown in FIG. 7(D). By the offset value OFST thus obtained, decoding of the pseudorandom code is completed (Step S10). Therefore, highly accurate absolute positioning is enabled.

Thus, since an optimal threshold value k is obtained, and binarizaticn is carried out using the threshold value k, a binarization process can be carried out in accordance with a lowering in the entire brightness input into the binarization circuit 124 even in cases where the entirety of the scale 102 is contaminated, where the output of the light-emitting element 108 is aged, where the interval between the scale 102 and the light-receiving element 112 is changed, where the sensitivity of the light-receiving element 112 is changed due to temperature and aging, and where the light quantity that the light-receiving element 112 receives differs due to the moving speed of the scale 102.

Also, where the scale 102 is partially broken or contaminated, since the distribution of the entire histogram is not greatly influenced, the threshold value k is hardly influenced. And, since the pseudorandom code is decoded at a cycle of the minimum line width $P_{ABS}$, it is possible to keep erroneous decoding to a minimum. Further, since determination of the threshold value k does not become unstable, quick binarization can be carried out.

Further, by comparing the dispersion $\sigma_B^2$, $\sigma W^2$ or $\sigma_T^2$ with the dispersion value obtained from the last time by means of the memory circuit and the comparison determination circuit, it is determined whether it is an abnormality or not, and an error signal ER may be output to the periphery of the absolute position length measurement type encoder 100. Therefore, it is possible to quickly repair or replace the absolute position length measurement type encoder 100, and at the same time, it is possible to prevent erroneous measurement of a measuring instrument having the absolute position length measurement type encoder 100 incorporated therein to the minimum.

In addition, decoding is carried out by the unit of the minimum line width $P_{ABS}$ of the ABS pattern 104, which is the same as the minimum unit of the pseudorandom code of the design value. Therefore, since the lengths of mutual codes match each other when being subjected to arithmetic operation of the correlation, it is possible to remarkably clearly determine whether there is any correlation. And, since the correlation is executed with the codes decoded, the arithmetic operation of the correlation itself can be carried out at a high speed.

That is, since, in the present invention, the optimal threshold value k to divide into two modes can be principally obtained, binarization errors of the signal SA3 produced from the ABS pattern 104 are reduced, and highly accurate and stabilized measurement of the absolute position can be carried out.

In particular, since bright and dark patterns are imaged on the light-receiving element 112 by using the lens array for the lens 110, an optimal threshold value can be obtained for each of the minor lenses 110A through 110E that compose the lens array. That is, influences due to a fluctuation in the light amount based on unevenness in production of the respective minor lenses 110A through 10E and due to unevenness and fluctuation in the sensitivity of the light-receiving elements 114 (minor arrays 114A through 114E) for each of the minor lenses 110A through 110E can be reduced. Therefore, since a lens array the characteristic of which is uneven for each of the minor lenses 110A through 110E can be used, an absolute position length measurement type encoder 100 that has strength against disturbance and is low in production cost while being thin can be brought about in addition to the effects described above.

Although a description was given of Embodiment 1 of the present invention, the present invention is not limited to Embodiment 1. That is, it is a matter of course that the present invention may be subjected to various improvements and design changes without departing from the spirit of the invention.

Figure 8:
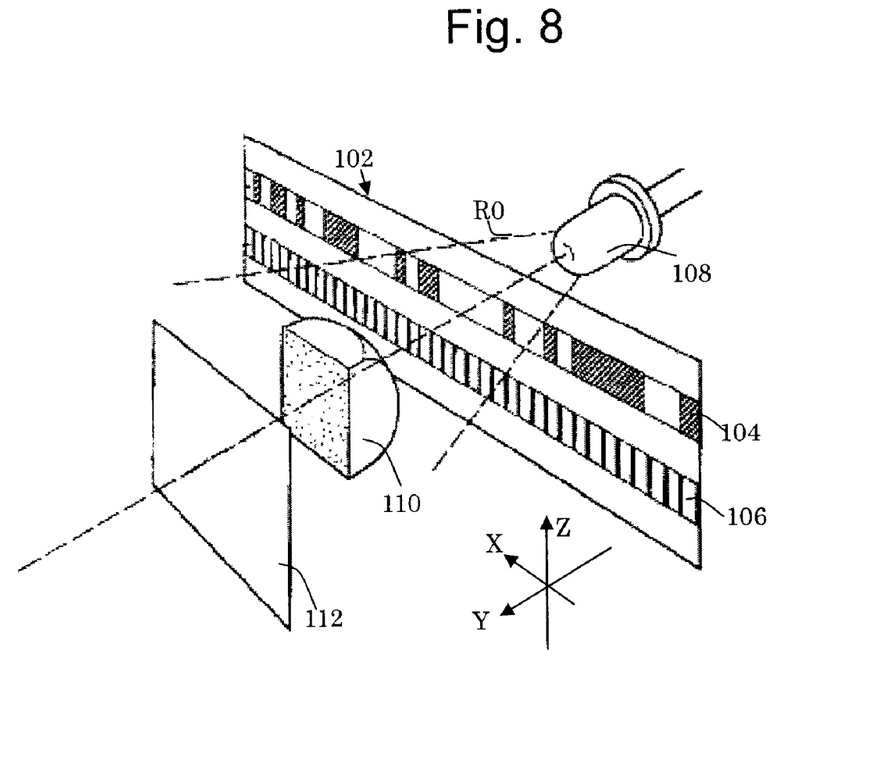
FIG. 8 is a schematic view showing the relationship between the light-emitting element, the scale and the light-receiving element according to Embodiment 2 of the present invention.

For example, in Embodiment 1, a lens array is used for the lens 110. However, the present invention is not limited thereto. For example, as in Embodiment 2 shown in FIG. 8, a single lens may be used for the lens 110. In this case, since bright and dark patterns are not individually swept in the reverse direction, the processing can be facilitated.

Figure 9:
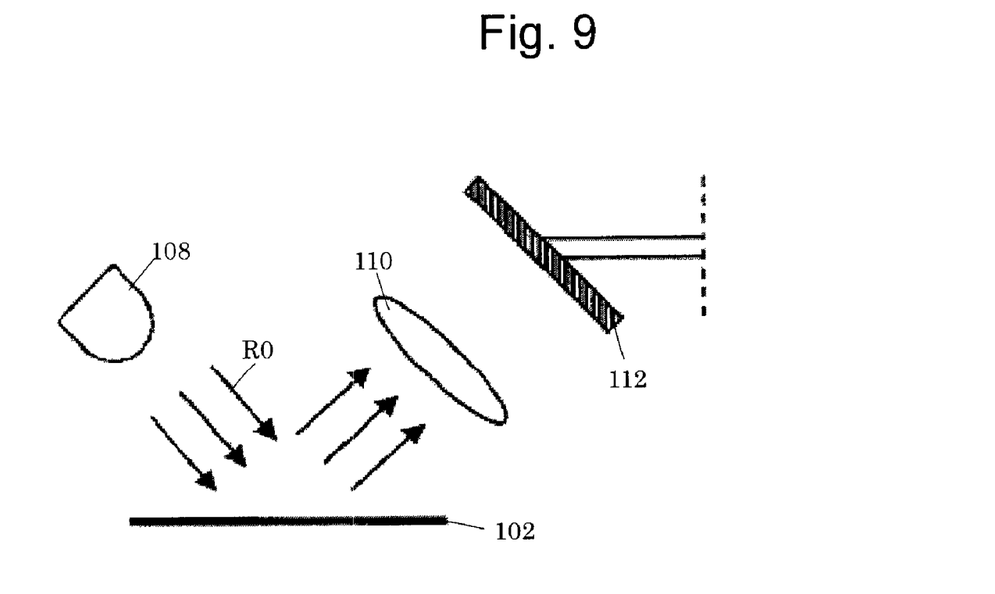
FIG. 9 is a schematic view showing the relationship between the light-emitting element, the scale and the light-receiving element according to Embodiment 3 of the present invention.

Further, although, in the embodiments described above, the bright and dark patterns formed by the scale 102 are formed by transmission light of the scale 102, for example, the present invention is not limited thereto. For example, as in Embodiment 3 shown in FIG. 9, such a configuration may be adopted, in which bright and dark patterns are formed by the projection light R0 to the scale 102 being reflected, and are imaged on the light-receiving element 112. In addition, even in a case where the light-receiving element 112 uses transmission light, or reflection light, it is not necessarily required that the lens 110 is used.

Also, for example, although, in the above-described embodiment, the binarization circuit 124 is provided with the memory circuit and the comparison determination circuit, the present invention is not limited thereto. For example, as the memory circuit and the comparison determination circuit are provided outside the absolute position length measurement type encoder 100, it may be configured that the obtained dispersion $\sigma_B^2$, $\sigma_W^2$ or $\sigma_T^2$ are output to the periphery of the absolute position length measurement type encoder 100. Further, it is not necessarily required that the dispersion $\sigma_B^2$, $\sigma_W^2$ or $\sigma_T^2$ are output to the periphery.

Also, for example, in the embodiment described above, in order to decode the pseudorandom code from the binarized values, decoding is carried out in such a manner that the total numbers of 1 and 0 are obtained at a cycle of the minimum line width $P_{ABS}$, comparison is carried out with respect to whether the total number of 1 is greater or the total number of 0 is greater, and the code is determined by the value the total number of which is greater. However, the present invention is not limited thereto. For example, the code of the minimum line width $P_{ABS}$ may be determined and decoded by determining that the value at a specified position (for example, the center) of the cycle of the minimum line width $P_{ABS}$ is 1 or 0.

Further, for example, although, in the embodiment described, dispersion $\sigma_B^2$, $\sigma_W^2$ or $\sigma_T^2$ has been used to determine an abnormality, the present invention is not limited thereto. For example, the bright and dark data in respective modes may be used as it is, and abnormality may be determined by using the average, minimum value and maximum value, dispersion, and deviation, etc., of the respective modes.

It should be apparent to those skilled in the art that the above-described embodiments are merely illustrative which represent the application of the principles of the present invention. Numerous C and varied other arrangements can be readily devised by those skilled in the art without departing from the spirit and the scope of the invention.

What is claimed is:

1. An absolute position length measurement type encoder comprising:
   a light-emitting element;
   a scale which has an absolute pattern based on a pseudo-random code and forms bright and dark patterns by the absolute pattern with respect to projection light from the light-emitting element;
   a light-receiving element for receiving the bright and dark patterns;
   a binarization circuit for dividing a digital signal in accordance with a signal output from the light-receiving elements into a mode having high brightness and a mode having lower brightness, carrying out a binarization process by a threshold value where dispersion with regard to the two modes is maximized, and decoding the pseudo-random code at the unit of minimum line width of the absolute pattern from the binarized values, wherein the binarization circuit obtains the respective total numbers of the binarization values at a cycle of the minimum line width of the absolute pattern, and determines and decodes the code of the minimum line width by the value the total number of which is greater; and
   a position detection circuit for calculating the absolute position of the scale with respect to the light-receiving element by acquiring the correlation between the decoded pseudorandom code and the design value of the pseudorandom code;
   wherein the scale comprises an absolute pattern and an incremental pattern.

2. An absolute position length measurement type encoder comprising:
   a light-emitting element;
   a scale which has an absolute pattern based on a pseudo-random code and forms bright and dark patterns by the absolute pattern with respect to projection light from the light-emitting element;
   a light-receiving element for receiving the bright and dark patterns;
   a binarization circuit for dividing a digital signal in accordance with a signal output from the light-receiving elements into a mode having high brightness and a mode having lower brightness, carrying out a binarization process by a threshold value where dispersion with regard to the two modes is maximized, and decoding the pseudo-random code at the unit of minimum line width of the absolute pattern from the binarized values, wherein the binarization circuit obtains the respective total numbers of the binarization values at a cycle of the minimum line width of the absolute pattern, and determines and decodes the code of the minimum line width by the value the total number of which is greater; and
   a position detection circuit for calculating the absolute position of the scale with respect to the light-receiving element by acquiring the correlation between the decoded pseudorandom code and the design value of the pseudorandom code; and,
   wherein bright and dark patterns formed by the scale are imaged on the light-receiving element via a lens array in which a plurality of lenses are linked to each other in parallel.

3. The absolute position length measurement type encoder according to claim 2, wherein the lens array is also applicable to the incremental pattern.

4. The absolute position length measurement type encoder according to claim 2, wherein the lens array simultaneously covers the absolute pattern and the incremental pattern.

5. An absolute position length measurement type encoder comprising:
   a light-emitting element;
   a scale which has an absolute pattern based on a pseudo-random code and forms bright and dark patterns by the absolute pattern with respect to projection light from the light-emitting element;
   a light-receiving element for receiving the bright and dark patterns;
   a binarization circuit for dividing a digital signal in accordance with a signal output from the light-receiving elements into a mode having high brightness and a mode having lower brightness, carrying out a binarization process by a threshold value where dispersion with regard to the two modes is maximized, and decoding the pseudo-random code at the unit of minimum line width of the absolute pattern from the binarized values, wherein the binarization circuit obtains the respective total numbers of the binarization values at a cycle of the minimum line width of the absolute pattern, and determines and decodes the code of the minimum line width by the value the total number of which is greater; and
   a position detection circuit for calculating the absolute position of the scale with respect to the light-receiving element by acquiring the correlation between the decoded pseudorandom code and the design value of the pseudorandom code; and,
   wherein the binarization circuit stores the dispersion from the last time and compares the same with the dispersion of this time, and outputs an error signal by determining abnormality if they are remarkably different from each other.

6. An absolute position length measurement type encoder comprising:
   a light-emitting element;
   a scale which has an absolute pattern based on a pseudo-random code and forms bright and dark patterns by the absolute pattern with respect to projection light from the light-emitting element;
   a light-receiving element for receiving the bright and dark patterns;
   a binarization circuit for dividing a digital signal in accordance with a signal output from the light-receiving elements into a mode having high brightness and a mode having lower brightness, carrying out a binarization process by a threshold value where dispersion with regard to the two modes is maximized, and decoding the pseudo-random code at the unit of minimum line width of the absolute pattern from the binarized values, wherein the binarization circuit obtains the respective total numbers of the binarization values at a cycle of the minimum line width of the absolute pattern, and determines and decodes the code of the minimum line width by the value the total number of which is greater; and
   a position detection circuit for calculating the absolute position of the scale with respect to the light-receiving element by acquiring the correlation between the decoded pseudorandom code and the design value of the pseudorandom code; and,
   wherein the dispersion with regard to the two modes is at least one of between-mode dispersion, in-mode dispersion and dispersion of the entire data.

* * * * *